United States Patent [19]

Weber

[11] Patent Number: 4,818,866

[45] Date of Patent: Apr. 4, 1989

[54] INTRUSION DETECTION SYSTEM FOR OPERATING INDUSTRIAL MACHINES WITH VARIABLE SENSITIVITY

[75] Inventor: Daniel R. Weber, Groton, Mass.

[73] Assignee: Data Instruments, Inc., Acton, Mass.

[21] Appl. No.: 120,732

[22] Filed: Nov. 10, 1987

Related U.S. Application Data

[63] Continuation of Ser. No. 818,275, Jan. 13, 1986, abandoned.

[51] Int. Cl.[4] ............................................... G01V 9/04
[52] U.S. Cl. ................................. 250/221; 250/222.1
[58] Field of Search ........................... 250/221, 222.1; 340/555–557

[56] References Cited

U.S. PATENT DOCUMENTS

| | | | |
|---|---|---|---|
| 3,551,683 | 12/1970 | Tothill | 350/167 |
| 3,805,061 | 4/1974 | De Missimy et al. | 250/221 |
| 4,015,122 | 3/1977 | Rubinstein | 250/221 |
| 4,249,074 | 2/1981 | Zettler et al. | 250/221 |
| 4,266,124 | 5/1981 | Weber et al. | 250/221 |

FOREIGN PATENT DOCUMENTS

0141677  5/1985  European Pat. Off. .
2290717  6/1976  France .

Primary Examiner—David C. Nelms
Attorney, Agent, or Firm—Schiller, Pandiscio and Kusmer

[57] ABSTRACT

An optical detection system of the sort adapted to enable and/or disable the operation of an associated industrial machine when an appropriate intrusion is detected. The optical intrusion detection system is adapted to have a variable sensitivity, whereby it can be set to respond to the intrusion of an object of a first size during one phase of operation of said machine and to an object of a second size during another phase of the operation of said machine.

15 Claims, 5 Drawing Sheets

INTRUSION DETECTION SYSTEM FOR OPERATING INDUSTRIAL MACHINES WITH VARIABLE SENSITIVITY

This is a continuation application of Ser. No. 818,275, filed Jan. 13, 1986, now abandoned.

FIELD OF THE INVENTION

This invention relates to intrusion detection systems in general, and more particularly to intrusion detection systems of the sort adapted to enable/disable the operation of an associated industrial machine when an appropriate intrusion is detected.

BACKGROUND OF THE INVENTION

Certain industrial machines comprise moving parts which can pose a danger to operators working around the machines. For example, a press for punching or forming metal stock typically requires that an operator work about successively opening and closing dies or other working members to first insert and then remove the stock being worked. It has been recognized that an intrusion detection system can be positioned between the operator and the industrial machine's moving parts to detect when the operator intrudes into the area of danger. This intrusion detection system may be adapted to shut down the machine if the intrusion occurs at an inappropriate time, e.g. if the operator's hands intrude between closing working members during the power stroke of the press.

Optical intrusion detection systems of the type described above are well known in the industry. Such systems generally comprise a "light curtain" formed by a plurality of parallel spaced light beams. More particularly, such optical intrusion detection systems generally comprise light transmitter means adapted to generate a plurality of parallel spaced light beams, light receiver means adapted to sense the light beams generated by the light transmitter means, and appropriate control circuitry adapted to operate the light transmitter means and light receiver means and also to communicate with the industrial machine which is being safeguarded. Whenever an opaque object of sufficient size passes through the area traversed by the light beams so as to block one or more of the light beams, the system recognizes that an intrusion has occurred. If the intrusion occurs at an inappropriate time, e.g. during the power stroke of the press, the system's control circuitry can immediately shut down the associated machine to prevent operator injury. See, for example, U.S. Pat. No. 4,266,124 (Weber et al.) and the references cited therein.

It has been recognized that different objects, having different light-blocking profiles, may penetrate the light curtain from time to time, with significantly different implications. For example, an oversized piece of metal stock may be properly positioned between the jaws or other working members of a press during the power stroke of the machine and yet still penetrate the light curtain, or a moving fixture or an ejected part may normally interrupt a portion of the light curtain; in such cases it may be desirable for the machine to remain enabled, despite the intrusion, so it can operate through its power stroke. However, an operator's hand may be improperly positioned so as to penetrate the light curtain during the power stroke of the machine; in this latter case it is obviously not desirable for the machine to remain enabled so it can operate through its power stroke.

Accordingly, some optical intrusion detection systems are designed to allow their associated industrial machines to operate when no light beams are broken or when a single light beam is broken, e.g. by a relatively thin piece of oversized metal stock or by a relatively thin gripping or transfer tool, but to shut down the industrial machines when more than one light beam is broken, e.g. by a relatively thick human hand. See, for example, U.S. Pat. Nos. 3,551,683 (Totkill), 4,015,122 (Rubinstein), and 4,249,074 (Zettler et al.). Inasmuch as the specific conditions for enabling or disabling the industrial machines can vary according to the particular application being undertaken, at least one of the prior art systems described above, that of U.S. Pat. No. 4,015,122 (Rubinstein), includes manual switches which allow the operator to initially instruct the optical intrusion detection system to ignore specific repetitive light beam obstructions, such as those caused by "permanent" installations. However, with this prior art system, as well as with all other known prior art systems, the detection sensitivity of the system remains fixed as long as the system is activated during the operating cycle of the system's associated industrial machine.

In this regard it should be noted that some optical intrusion detection systems are designed to be fully enabled during the entire operating cycle of the machine. In such a situation, the industrial machine can be adapted to either ignore penetrations detected during "non-hazardous" portions of the machine's operation (e.g. the upstroke) or it can allow itself to be shut down by such penetrations. Other optical intrusion detection systems are designed to be fully activated during "hazardous" portions of the machine's operation (e.g. the downstroke) and fully deactivated during non-hazardous portions of the machine's operation. In any case, even with optical intrusion detection systems of this latter type, the detection sensitivity of the system remains fixed as long as the system is activated during the operating cycle of the associated industrial machine. For the purposes of this description, all such systems shall be considered to have a fixed detection sensitivity.

I have recognized that in some situations it may be desirable to have an optical intrusion detection system which can vary its detection sensitivity in accordance with changes in the operating cycle of the associated industrial machine. For example, it might be desirable to have the optical intrusion detection system set to respond to the intrusion of an object of size X or larger during one phase of the machine's operation, and set to respond to the intrusion of an object of size ½X or larger during another phase of the machine's operation. With prior art devices, it is necessary to preset the detection system to respond during any periods the system may be activated to objects of either size X or size ½X throughout the entire operating cycle of the system's associated industrial machine, since such prior art detection systems are incapable of changing their detection sensitivity automatically in accordance with changes in the operating cycle of the system's associated industrial machine.

An optical intrusion detection system capable of adjusting its sensitivity in response to varying machine states is particularly desirable in the situation where it is to be used to both start and stop the operation of an associated industrial machine. More particularly, during the machine's initial "idle" period, when the optical intrusion detection system is to be used as a trigger device to initiate operation of the machine upon detecting the intrusion and then withdrawal of the operator's hand through the light curtain as the workpiece is placed on the die, it is desirable to have the system set to respond only to the intrusion and then withdrawal of a relatively large object, i.e., the operator's hand, so that the machine will not be started prematurely by minor accidental intrusions. However, during the machine's subsequent "run" period or cycle, when the optical intrusion detection system is to be used as a safety device to halt operation of the industrial machine upon detecting an appropriate intrusion, it is desirable to have the system set so that it will err on the side of caution and cause the machine to stop immediately upon detecting the intrusion of an object of almost any size, thereby reducing the risk of operator injury.

It is noted that the term "presence sensing device initiation", or "PSDI", is frequently used in the industry to refer to the use of an optical intrusion detection system to both start and stop the operation of an associated industrial machine.

OBJECTS OF THE INVENTION

Accordingly, the primary object of the present invention is to provide an improved optical intrusion detection system for controlling the operation of a cyclically operating manufacturing machine which has a variable detection sensitivity, in order that the detection system can be set to respond to the intrusion of an object of a first size during one phase of the operation of the associated machine and to an object of a second size during another phase of the machine's operation.

Another object of the invention is to provide an optical intrusion detection system of the type described which can be set so as to be insensitive to relatively small objects during one phase of operation of a machine and yet sensitive to the same relatively small objects during another phase of operation of the same machine.

Still another object of the invention is to provide an optical intrusion detection system of the type described which is adapted to serve as a trigger device to start the operation of an associated industrial machine, and also as a safety device to stop the operation of the same machine.

SUMMARY OF THE INVENTION

These and other objects of the invention are achieved by a novel optical intrusion detection system which comprises light transmitter means adapted to generate a plurality of parallel spaced light beams, light receiver means adapted to sense the light beams generated by the light transmitter means, and appropriate control circuitry adapted to operate the light transmitter means and light receiver means and also to communicate with control elements of the industrial machine which is being safeguarded, wherein the appropriate control circuitry is adapted to enable or disable the industrial machine when X or more light beams are blocked during one phase of the operation of the industrial machine, and to enable or disable the industrial machine when Y or more light beams are blocked during another phase of the operation of the industrial machine.

In the preferred embodiment of the invention, the novel optical intrusion detection system is adapted to be used as both a trigger device to initiate operation of the industrial machine when X or more light beams are blocked (and then restored) during an initial "idle" phase of the industrial machine, and as a safety device to halt operation of the industrial machine when Y or more light beams are blocked during a subsequent "run" phase of the industrial machine. By arranging the system so that X is a number greater than Y, it can be assured that the system will only start the "idling" industrial machine when it senses the intrusion (and then withdrawal) of a relatively large object through the light curtain, i.e, the operator's hand placing the workpiece on the die, and yet will automatically stop the "running" industrial machine as soon as it senses any intrusion at all through the light curtain. The control circuitry comprise programmable logic circuits, so that the particular characteristics of the optical intrusion detection system may be software controlled.

DESCRIPTION OF THE DRAWINGS

Still other objects and features of the present invention will be more fully disclosed or rendered obvious in the following detailed description of the preferred embodiment of the invention, which is to be considered together with the accompanying drawings wherein like numbers refer to like parts and further wherein.

DETAILED DESCRIPTION OF THE PREFERRED EMBODIMENT

Figure 1:
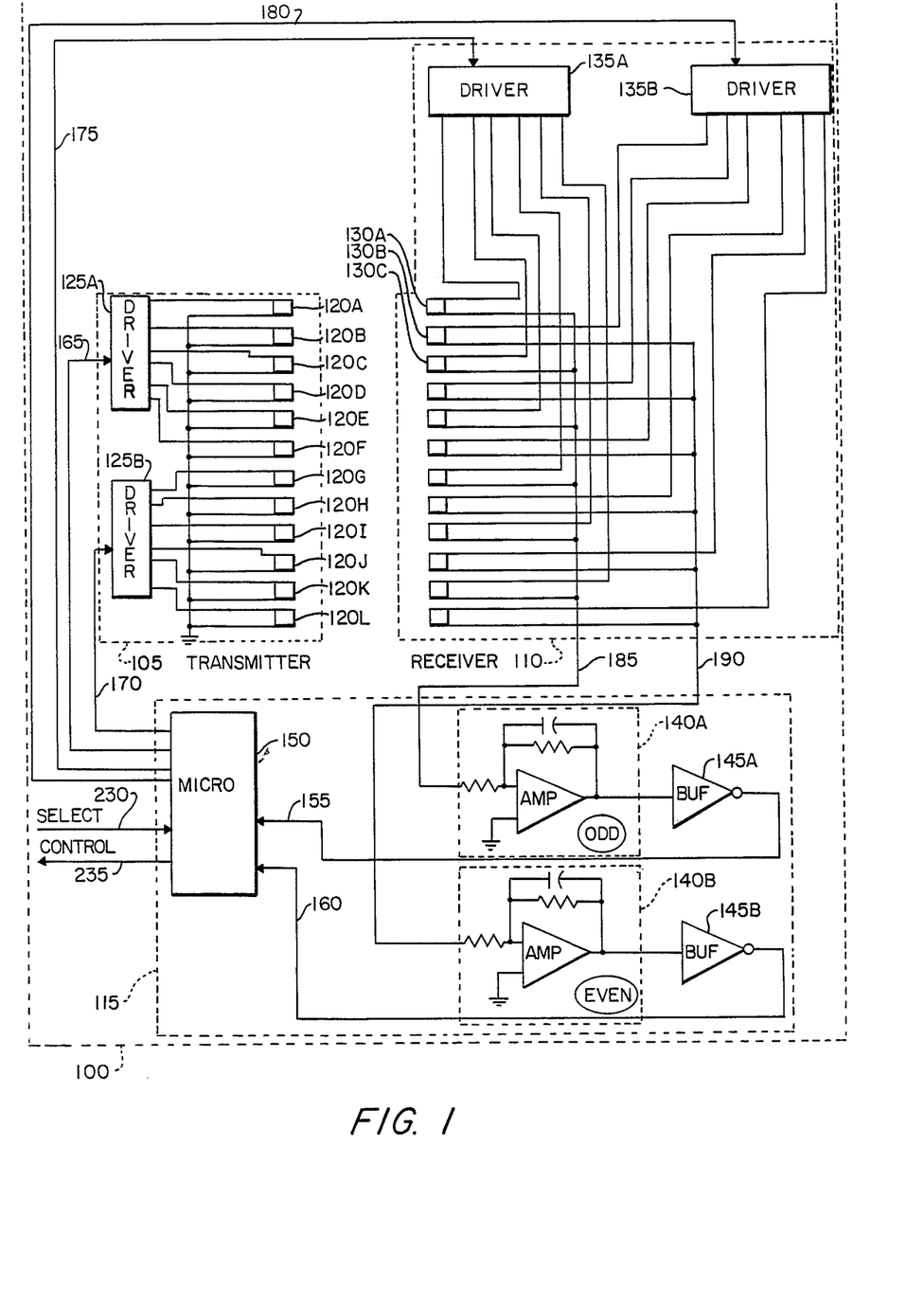
FIG. 1 is a schematic diagram illustrating a preferred embodiment of the novel optical intrusion detection system.

Looking first at FIG. 1, there is shown a novel optical intrusion detection system 100 that generally comprises light transmitter means 105, light receiver means 110, and control circuitry 115.

Light transmitter means 105 comprises twelve light sources 120A-120L connected to two driver modules 125A and 125B. Light sources 120A-120L are conventional light emitting diodes ("LEDs") of the sort adapted to emit a narrow infrared beam of light in response to an appropriate electrical impulse. Driver modules 125A and 125B are conventional solid state devices of the sort having a plurality of output lines for providing electrical signals to selectively energize individual ones of light source 120A-120L in response to appropriate electrical control signals received from a microprocessor 150, as will hereinafter be described in further detail. Microprocessor 150 is of conventional design and may be one of a variety of microprocessors well known in the art. Microprocessor 150 includes a plurality of associated flags or registers for recording the occurrence of selected events, as will hereinafter be described in further detail.

Light receiver means 110 comprises twelve light sensors 130A-130L and two driver modules 135A and 135B. Light sensors 130A–130L are conventional phototransistors of the sort adapted to amplify a given electrical impulse in response to the reception of light. Light sensors 130A–130L are aligned with their corresponding light sources 120A–120L, and they are adapted to have a peak sensitivity in the infrared range so that they are appropriately matched to the primary radiation emitted by light sources 120A–120L. Driver modules 135A and 135B are conventional solid state devices of the sort having a plurality of output lines for providing electrical signals to selectively activate individual ones of light sensors 130A–130L in response to appropriate electrical control signals received from microprocessor 150, as will hereinafter be described in further detail.

Control circuitry 115 comprises a pair of amplifier circuits 140A and 140B, a pair of inverters or buffers 145A and 145B, and computer means in the form of a microprocessor 150. Amplifier circuits 140A and 140B are conventional operational amplifier circuits of the sort adapted to produce a signal pulse when the output of an analog input device reaches a selected level. The outputs of amplifiers 140A and 140B are connected to the inputs of inverters 145A and 145B, respectively. Inverters 145A and 145B are of the sort well known in the digital signal processing art. The outputs of inverters 145A and 145B are connected to two different input ports of microprocessor 150 by lines 155 and 160 respectively. By having two amplifier/inverter channels, one for the "odd-numbered" detectors 130A, 130C, 130E, 130G, 130I and 130K, and the other for the "even-numbered" channels 130B, 130D, 130F, 130H, 130J, and 130L, there is redundancy for increased failsafing of the system. Additionally, by using two amplifier/inverter channels, it is possible to have two adjacent light sources and their corresponding light sensors activated simultaneously, or in time-overlapping relation, if this should be desired; however, in the preferred embodiment the "odd-numbered" and "even-numbered" detectors 130 are alternated in activation sequence to eliminate any possibility of optical crosstalk between adjacent detectors.

Light transmitter means 105, light receiver means 110 and control circuitry 115 are interconnected as shown. More specifically, microprocessor 150 has twenty-four output lines, twelve connected to the input ports of driver modules 125A and 125B, and twelve connected to the input ports of driver modules 135A and 135B. For convenience of illustration, lines 165, 170, 175 and 180 each represent six computer output lines. The outputs of the "odd numbered" light sensors 130A, 130C, 130E, 130G, 130I and 130K are connected to the input of amplifier circuit 140A by a line 185, and the outputs of the "even numbered" light sensors 130B, 130D, 130F, 130H, 130J and 130L are connected to the input of amplifier circuit 140B by a line 190. Microprocessor 150 is adapted to generate four trains of clock pulses at a common fixed frequency, with one train of clock pulses applied to driver module 125A, a second train applied to driver module 125B, a third train applied to driver module 135A, and the fourth train applied to driver module 135B. The pulse trains are arranged so that light sources 120A–120L are energized sequentially in the order named at the selected frequency, and the corresponding phototransistors 130A–130L are activated simultaneously and in the same order as light sources 120A–120L respectively. Thus, each time a light source is energized by driver module 125A or 125B, its corresponding light sensor, i.e., phototransistor, is biased "on" by driver module 135A or 135B so that it will respond to the light beam from the corresponding light source. However, if a light beam is blocked, the corresponding sensor will not generate an output pulse even though it is biased "on". Similarly, if no light beam is produced by a light source when it receives a pulse from its driver module 125A or 125B, or if a light beam is produced but the corresponding phototransistor does not respond in response to a pulse from its driver module 135A or 135B (or gets no energizing pulse from its driver module), the signal input to amplifier 140A or 140B, as the case may be, will show no light beam, just as when a light beam is blocked. It is to be appreciated that while in the foregoing description it was stated that a given light sensor is activated "simultaneously" with its corresponding light source whenever a given light channel is activated, in practice it is frequently desirable to activate a given light sensor slightly before activating its corresponding light source, in order to assure proper light sensor response.

Figure 2:
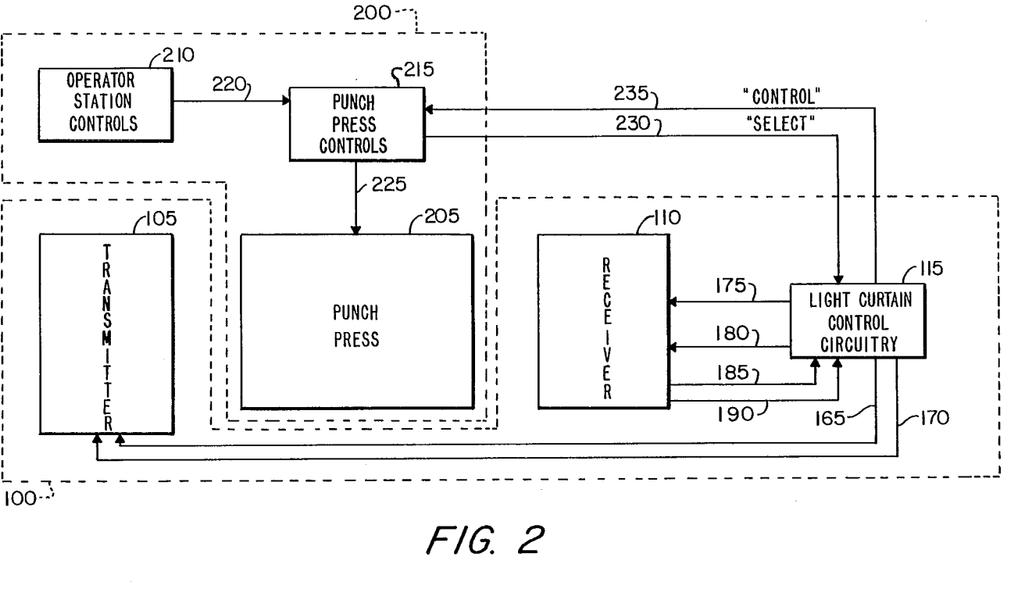
FIG. 2 is a block diagram illustrating how the preferred embodiment of the novel optical intrusion detection system interfaces with the various parts of a representative industrial machine such as an hydraulic or mechanical power metal forming punch press.

Looking next at FIG. 2, the novel optical intrusion detection system 100 is intended to be connected to a representative industrial manufacturing machine 200 that, for example, comprises a press 205 for punching or reforming metal stock, operator station controls 210 that allow the machine operator to input power on/power off commands to the industrial machine, and press controls 215 for controlling operation of the press.

By way of example, operator station controls 210 may take the form of an on/off switch and a latching relay for coupling the system to an electrical power supply.

Press controls 215 comprise means for determining the operating state of punch press 205 and means for starting and stopping punch press 205 in response to selected control signals, e.g. a control signal generated by light curtain control circuitry 115. Typical press controls are exemplified by U.S. Pat. Nos. 3,805,061 and 4,266,124 and the references cited therein. Press controls 215 are of the sort well known in the art and are therefore not shown in detail.

Still referring to FIG. 2, operator station controls 210 are connected to press controls 215 as represented by line 220, and press controls 215 are connected to the electric drive motor (not shown) of press 205, as represented by line 225.

Although not shown, it is to be understood that light transmitter means 105, light receiver means 110, and the light curtain control circuitry 115 are coupled to a suitable power supply (not shown) when operator station controls 210 are turned "on". Optical intrusion detection system 100 is attached to the manufacturing machine 200 by positioning its light transmitter means 105 and light receiver means 110 adjacent the portion of the press which is to be monitored, so that the detection system's light curtain extends across the area between the machine's operator and stock-receiving section of the press that is the danger area for the operator. In addition, press controls 215 are connected to an input port of microprocessor 150 of light curtain control circuitry 115 by a "select" line 230 (FIG. 1), and an output port of microprocessor 150 is connected to an input terminal of press controls 215 by a "control" line 235.

Figure 3:
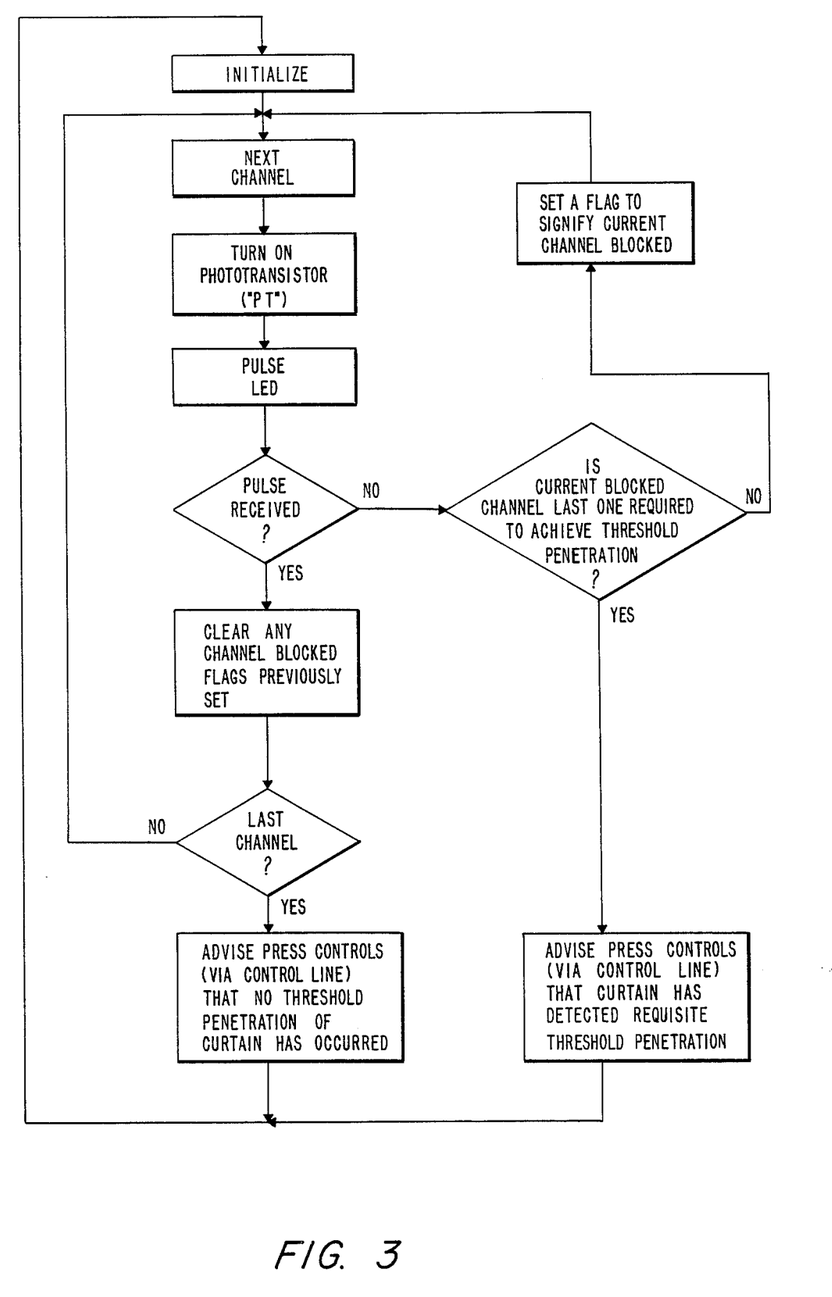
FIG. 3 is a flow diagram illustrating the mode of operation of a general form of the novel optical intrusion detection system.

By appropriately programming microprocessor 150 in ways well known in the art, the novel optical intrusion detection system 100 can be made to operate in conjunction with machine 200 so that the intrusion detection system will enable or disable the industrial machine when X or more light beams are blocked during one phase of the operation of the industrial machine, and so that the intrusion detection system will enable or disable the industrial machine when Y or more light beams are blocked during another phase of the operation of the industrial machine. It is to be appreciated that the description which immediately follows reflects the mode of operation of a general form of the invention and is not limited to a specific embodiment. Reference should be had to FIG. 3, which illustrates the mode of operation of this general form of the invention in flow chart form.

Initially the machine operator will use operator station controls 210 to apply power to press controls 215. Press controls 215 respond by putting press 205 in a first phase of operation and, simultaneously, press controls 215 advise light curtain control circuitry 115 of this fact by sending it a signal via "select" line 230. This signal serves to advise the microprocessor, by virtue of its pre-programmed instructions, as to how many consecutive light beams must be broken during this phase of the machine's operation in order to constitute the threshold intrusion. Thus, for example, if press controls 215 send microprocessor 150 a "high" signal along "select" line 230, the microprocessor's pre-programmed instructions might cause the microprocessor to watch for and act upon the interruption of at least three adjacent light beams during this phase of the machine's operation, and to ignore all lesser intrusions.

Microprocessor 150 would activate a first one of the light sensors 130A–130L (typically phototransistors, or "PTs"), and then activate a corresponding one of light sources 120A–120L (typically "LEDs"). As such activation occurs, the microprocessor would monitor the output of inverters 145A and 145B via lines 155 and 160, respectively, for signal outputs representative of the occurrence of light blockages. Microprocessor 150 will interpret the signals from inverters 145A and 145B as indicative of either the absence or presence of an opaque object in the path of a light beam generated by one of the light sources 120A–120L. If this first pulse was received, the microprocessor would be sure that any flags it had dedicated to tracking blocked light beams were cleared (they should all be clear at this point, since this was the first light beam pulsed), and then the microprocessor would test to see if the channel just pulsed was the last channel in the sequence to be checked (again, this should not be the last channel in the sequence to be checked, since it was the first channel pulsed). Assuming that this was not the last channel in the sequence to be checked, the microprocessor would move on to the next adjoining channel and repeat the foregoing process. In the event that the microprocessor checked every channel in the sequence without detecting any light blockages whatsoever, the microprocessor would advise press controls 215 of this fact by sending them an appropriate signal along "control" line 235, and then the microprocessor would resume its cycle of polling the light channels.

When the microprocessor detected a first light beam being blocked, the microprocessor's pre-programmed instructions would cause the microprocessor to test to see if the current light beam being blocked was the last one required to be blocked during this phase of the machine's operation in order to constitute the required threshold intrusion. If the microprocessor's pre-programmed instructions indicated that an intrusion of only one light beam were necessary to constitute the threshold intrusion during this phase of the operation of the industrial machine, the microprocessor would immediately advise press controls 215 (via "control" line 235) that the threshold intrusion had occurred, whereupon press controls 215 would initiate the desired action, e.g. stop the press. If, on the other hand, the microprocessor's pre-programmed instructions indicated that an intrusion of more than one light beam was required to be blocked at this stage of the machine's operation in order to constitute the requisite threshold intrusion, the microprocessor would simply set a flag to record the current detected intrusion, and then it would resume polling the light curtain with the next channel. If the following channel is clear, the microprocessor clears the flag just set (since the occurrence of the clear channel indicates the intrusion previously detected was too few consecutive light beams to constitute the requisite threshold intrusion) and then resumes polling. If the following channel is not clear, the microprocessor would test to see if the current light beam being blocked was the last one required to be broken during this phase of the machine's operation and, if the current broken beam was the last broken beam necessary to constitute the requisite intrusion, microprocessor 150 would advise press controls 215 of this fact via "control" line 235. If, on the other hand, the current broken beam was not the last broken beam necessary to constitute the requisite intrusion during this phase of the machine's operation, the microprocessor would set another flag to record the current detected intrusion and then continue polling the light curtain to see if the next beam was broken. The foregoing process is continued over and over.

By way of example, suppose the microprocessor's pre-programmed instructions require three consecutive beams to be broken during this phase of the operation of the industrial machine in order to constitute the requisite intrusion. Then, so long as at least three consecutive beams are not blocked, microprocessor 150 would advise press controls 215 that there was no requisite threshold penetration via "control" line 235; as soon as the three consecutive beams were blocked, microprocessor 150 would advise press controls 215 of the threshold penetration via "control" line 235, whereupon press controls 215 can initiate the desired action, e.g. start or stop the press.

When the industrial machine thereafter enters a subsequent phase of its operation, press controls 215 will advise light curtain control circuitry 115 of this fact by sending a new signal to microprocessor 150 via "select" line 230, in which event light curtain control circuitry 115 will modify its detection criteria, i.e., the number of light beams required to be blocked to cause a change in machine operation, according to the microprocessor's pre-programmed instructions. For example, press controls 215 might send microprocessor 150 a "low" signal along "select" line 230, whereby the microprocessor's pre-programmed instructions might cause the microprocessor to watch for and act upon the interruption of at least two adjacent light beams during this phase of the machine's operation. Once again, the microprocessor would operate in accordance with the flow chart shown in FIG. 3. For example, suppose the microprocessor's pre-programmed instructions require two consecutive light beams to be broken during this new phase of the operation of the industrial machine in order to constitute the requisite intrusion. Then, so long as at least two consecutive beams are not blocked, microprocessor 150 would advise press controls 215 that there was no requisite threshold penetration via "control" line 235; as soon as the two consecutive beams were blocked, microprocessor 150 would advise press controls 215 of the threshold penetration via "control" line 235, whereupon press controls 215 can initiate the desired action, e.g. start or stop the press.

In this way, system 100 can have a light curtain sensitivity which varies according to certain pre-programmed instructions and certain independent events, e.g. varying machine phases. By providing sufficient means for allowing press controls 215 to appropriately signal microprocessor 215 and by providing sufficient memory to hold the microprocessor's instructions, system 100 can be made to adjust its light curtain sensitivity according to many different machine states.

Figure 4:
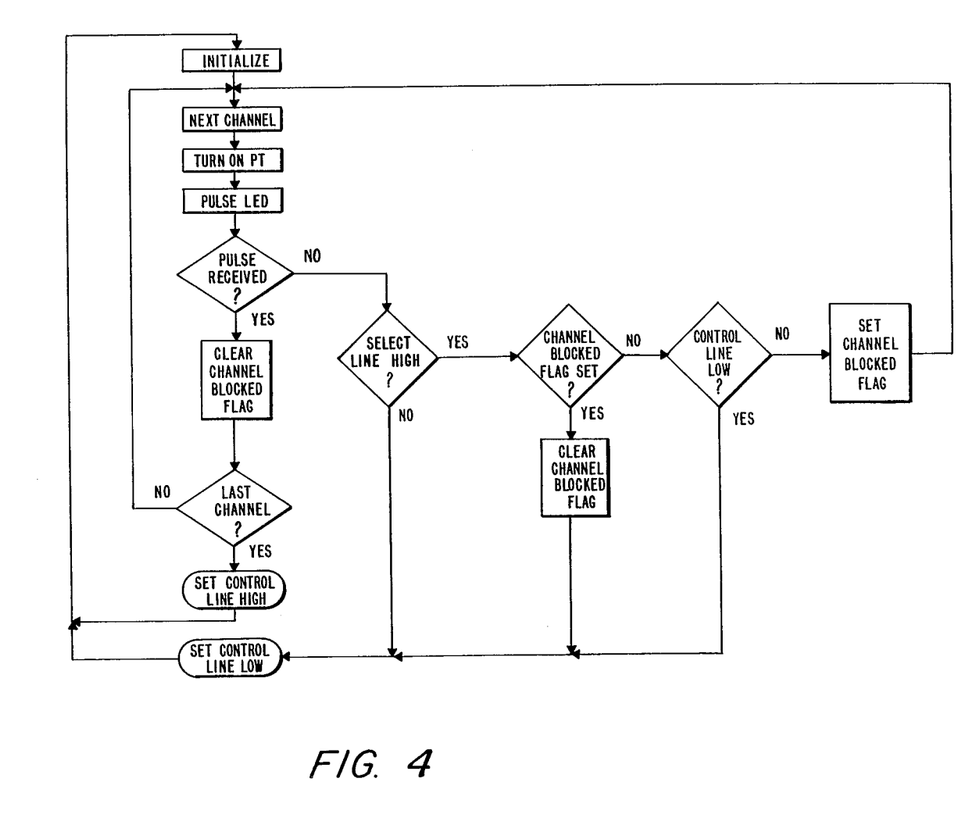
FIG. 4 is a flow diagram illustrating the mode of operation of a preferred embodiment of the novel optical intrusion detection system.
Figure 5:
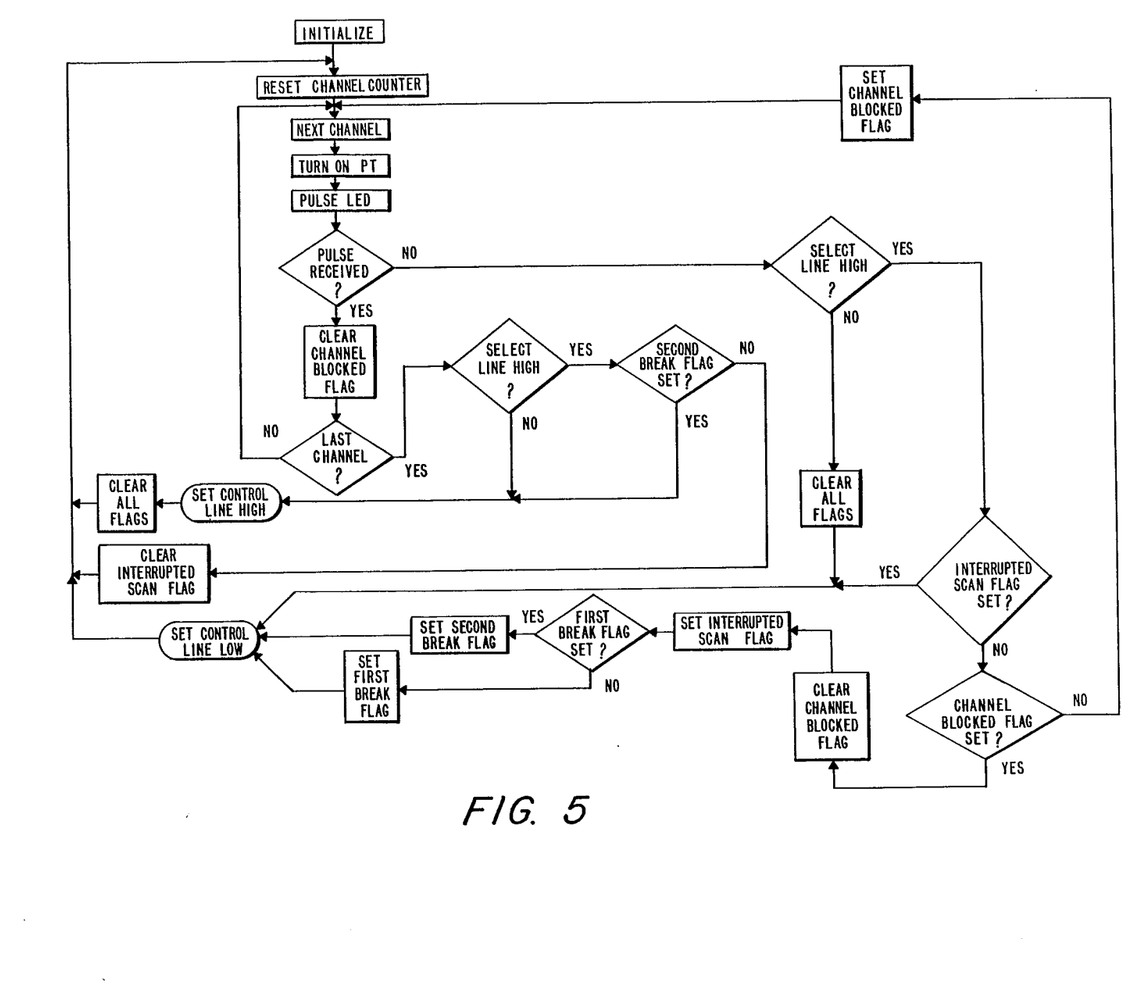
FIG. 5 is a flow diagram illustrating the mode of operation of an alternative embodiment of the novel optical intrusion detection system.

In the flow chart of FIG. 3, as well as in the other flow charts of FIGS. 4 and 5, the block "initialize" is meant to symbolize any preliminary activities required by the microprocessor and its associated hardware prior to beginning a scanning sequence, e.g. clearing all flags, any self-diagnostics, etc.

In the preferred embodiment, optical intrusion detection system 100 is adapted to be used as a trigger device to automatically initiate operation of industrial machine 200 when two or more light beams are first blocked and then restored during the initial "idle" phase of the industrial machine, and as a safety device to automatically halt operation of the industrial machine if a single light beam is blocked during the subsequent "run" phase of the industrial machine. By requiring that two or more light beams be broken to trigger the industrial machine from its "idle" state to its "run" state, it is assured that only the intrusion and then withdrawal of a relatively large object, i.e., the operator's hand, will activate the machine; on the other hand, by requiring that only one light beam need be broken to stop the industrial machine during its "run" phase, it is assured that the system will respond to the intrusion of an object of almost any size, so as to prevent injury to the operator. FIG. 4 illustrates this preferred mode of operation in flow chart form.

Looking next at FIGS. 1, 2 and 4 collectively, the preferred embodiment of the optical intrusion detection system is adapted to operate in conjunction with industrial machine 200 as follows. The machine's operator first uses operator station controls 210 to instruct press controls 215 to power up press 205 and make it ready to run. Press controls 215 do this by sending an appropriate signal to press 205 via line 225. As the machine settles into its initial "idle" mode, waiting to be automatically started by the operator's hand breaking and then unbreaking the light curtain as the workpiece is placed on the die of the press, press controls 215 simultaneously send a "high" signal to microprocessor 150 of light curtain control circuitry 115 via the "select" line 230. This "high" signal instructs the microprocessor, by virtue of its pre-programmed instructions, to monitor the light curtain for any intrusions large enough to block two or more adjacent light beams, and to ignore all lesser intrusions. As a safety precaution, press controls 215 are also typically adapted so that they will automatically disarm the press if the operator's hand does not break and then unbreak the light curtain within some predetermined time period, e.g. 5 seconds, after the operator instructs press controls 215 to power up the press, or after the press has completed a full operating cycle. This feature prevents the operator from leaving a press fully armed during a period when the press is not being actively worked. If press controls 215 do automatically shut down the press due to the fact that the operator's hand does not break and unbreak the light curtain within the prescribed time period, the operator must then typically rearm the machinery using operator station controls 210.

Microprocessor 150 energizes light sources 120A–120L in a predetermined sequence and simultaneously activates light sensors 130A–130L in a corresponding sequence. As this is done, the microprocessor monitors the outputs of inverters 145A and 145B. So long as signals indicative of unbroken light beams are applied to microprocessor 150 by buffers 145A and 145B at the same frequency as the light sources are activated, microprocessor 150 will maintain the signal output on "control" line 235 at the "high" level and keep the "channel blocked" flag clear.

When a light beam from one of light sources 120A–120L is not received by its associated light sensor, the "high" signal on "select" line 230 causes the microprocessor to check if its associated "channel blocked" flag is set. If that light beam is the first light beam to be blocked, the "channel blocked" flag will be clear and, since the "control" line is then "high", the microprocessor will take no action other than to set the "channel blocked" flag, whereupon polling of the light curtain continues with the next light beam. If the next light beam is successfully received (i.e., it is not blocked), the microprocessor will respond by clearing the "channel blocked" flag before continuing polling of the light curtain with the next light beam.

If and when a light beam is blocked while the "channel blocked" flag is set, signifying that the current light beam being blocked is the requisite second consecutive light beam to be blocked, the microprocessor will respond by clearing the "channel blocked" flag and sending a "low" signal to press controls 215 on "control" line 235 to signal that the threshold "two beam" intrusion has been detected. Press controls 215 do not yet activate press 205, however, since the intrusion being sensed is the operator's hand placing a workpiece in the press, without the requisite withdrawal of the operator's hand. The microprocessor, by virtue of its preprogrammed instructions, continues monitoring the light curtain, waiting for all of the blocked light beams to be unblocked, i.e., for the intrusion (the operator's hand) to be withdrawn. As long as at least one light beam remains blocked while the "select" line is "high" and the "control" line is "low", the microprocessor will continue sending a "low" signal to press controls 215 on "control" line 235 to advise the press controls that some intrusion is still occurring. As soon as the intrusion is completely withdrawn, so that none of the light beams is then blocked, buffers 145A and 145B will provide signals to microprocessor 150 indicating that fact, whereupon microprocessor 150 will respond by sending press controls 215 a "high" signal on "control" line 235. Press controls 215 thereupon reset the signal on "select" line 230 from "high" to "low". Press controls 215 thereupon initiate operation of press 205.

As the machine settles into its subsequent "run" mode, ready to be automatically stopped by any detectable intrusion, press controls 215 continue to send a "low" signal to microprocessor 150 via "select" line 230. This "low" signal instructs the microprocessor, by virtue of its pre-programmed instructions, to monitor the light curtain for any intrusions large enough to block even one light beam. In the event that such an intrusion is detected, the microprocessor will respond by changing the "high" signal on "control" line 235 to a "low" signal. Press controls 215 will thereupon immediately stop operation of the press. In the event that no such intrusion is detected, the microprocessor will maintain the "high" signal on "control" line 235 and press controls 215 will permit press 205 to complete its power stroke without interruption. Thereafter, the punch press will prepare itself for its next power stroke by opening its working members.

In some circumstances punch press 205 will be provided with means for automatically ejecting the finished workpiece from the press. If this is the case, the press will automatically eject the finished workpiece as its working members open in preparation for its next power stroke. Additionally, punch press controls 215 will send a new "high" signal to microprocessor 150 via the "select" line 230. At this point, the punch press will have resumed its original "idle" state once more, waiting to be automatically started by the operator's hand breaking and then unbreaking the light curtain as a new workpiece is placed on the die. Such a mode of operation is sometimes referred to in the industry as "one break" operation. Once again, press controls 215 may be adapted so that they will automatically disarm the press if the operator's hand does not break and then unbreak the light curtain within some predetermined period, e.g. 5 seconds.

In the event that punch press 205 is not provided with means for automatically ejecting the finished workpiece from the press, a slightly different mode of operation (sometimes referred to as a "two break" operation in the industry) is utilized. More particularly, as the press working members open in preparation for the next power stroke, punch press controls 215 will send a new "high" signal to microprocessor 150 via the "select" line 230, thus advising the microprocessor that the punch press is in its "idle" period and instructing it to monitor the light curtain for the occurrence of any intrusions large enough to block two or more light beams, and to ignore all lesser intrusions. When the operator thereafter reaches into the press to remove a finished workpiece, the light curtain is broken by the requisite threshold intrusion. Microprocessor 150 advises punch press controls 215 of this intrusion by sending them a "low" signal on the "control" line 235. The microprocessor, by virtue of its pre-programmed instructions, continues to monitor the light curtain for any intrusions large enough to block even one light beam. As long as any portion of the operator's hand continues to penetrate the light curtain so as to break even one light beam, the microprocessor will continue sending a "low" signal to press controls 215 on control line 235. When the operator is finished removing the finished workpiece from the press, so that none of the light beams of the light curtain are blocked, microprocessor 150 will advise press controls 215 of this fact by raising a "high" signal on "control" line 235. Press controls take no action at this point, however, since the press is then empty. At this point, the punch press has essentially returned to its original "idle" state once more, waiting to be automatically started by the operator's hand breaking and then unbreaking the light curtain as a new workpiece is placed on the die. Once again, press controls 215 may be adapted so that they will automatically disarm the press if the operator's hand does not break and then unbreak the light curtain within some predetermined period, e.g. 5 seconds.

It is to be noted that the length of time the machine will remain in its idle state before being disarmed (assuming no interruption of the light curtain during that time period) may be established by the microprocessor or by press controls 215.

It is to be appreciated that in the preceding description relating to FIG. 4, on account of the fact that press controls 215 require a "high" signal on "control" line 235 to start the press (signifying complete removal of the operator's hand) after they first receive a "low" signal on that line (signifying insertion of the operator's hand), microprocessor 150 was effectively programmed to alter the light curtain's detection sensitivity from "two beams" to "one beam" after the operator's hand has been detected breaking the light curtain and before it is withdrawn. Alternatively, press controls 215 could use the "select" line 230 to instruct microprocessor 150 to change the light curtain's sensitivity from "two beams" to "one beam" after the operator's hand has been detected breaking the light curtain and before it is withdrawn.

It is also possible to design the system so that microprocessor 150 does not alter its detection sensitivity from "two beams" to "one beam" after the operator's hand has been detected breaking the light curtain and before it is withdrawn. In this event, the microprocessor will simply continue monitoring the light curtain for any intrusions large enough to block two or more light beams (and to ignore all lesser intrusions), rather than monitoring the light curtain for intrusions large enough to block even one light beam. Of course, such an operation is generally not preferred, since it is conceivable that after an initial "two beam" penetration, the operator might adjust the position of his hand so that it was thereafter still intruding across the light curtain but only interrupting one light beam, whereupon the microprocessor would indicate to press controls 215 that the intrusion had been completely removed. On account of this potentially disastrous possibility, it is generally preferred to have the device operate as previously described, whereby microprocessor 150 effectively alters its intrusion sensitivity from "two beams" to "one beam" as soon as the operator's hand has been detected breaking the light curtain.

ALTERNATIVE EMBODIMENT

In the preferred embodiment described above, all decisions on press status and press mode are made directly in punch press controls 215, and microprocessor 150 is only used to control the light curtain. More specifically, in the preferred embodiment described above, punch press controls 215 determine the press status and press mode and, depending on the same, press controls 215 send an appropriate signal to microprocessor 150 on "select" line 230. Microprocessor 150 utilizes this signal to set its sensitivity level and then serves only to scan the light curtain for the occurrence of a threshold penetration. When such a penetration occurs, microprocessor 150 signals punch press controls 215 on "control" line 235 and punch press controls 215 then decide whether or not to shut down the press.

As an alternative arrangement, it is possible to use microprocessor 150 to make some or all of the decisions on press status and press mode, as well as to control the light curtain.

For example, with such an arrangement, punch press controls 215 might be used simply to advise microprocessor 150 of when punch press 205 changes operating status. In such case, microprocessor 150 could be pre-programmed to decide whether the light curtain is activated during a particular state and, if it is, microprocessor 150 could be pre-programmed as to what the detection criteria is to be during that press state. Furthermore, if a threshold detection is detected during a particular press state, microprocessor 150 could then decide whether the press should be started or stopped, or neither, depending on the current state of the press.

Where microprocessor 150 is being used in such an alternative manner and where punch press 205 is provided with means for automatically ejecting the finished workpiece from the press ("one break" operation), the flowchart shown in FIG. 4 will still apply. However, in the case where microprocessor 150 is being used in such an alternative manner and where punch press 205 is not provided with means for automatically ejecting the finished workpiece from the press ("two break" operation), the flowchart shown in FIG. 4 will no longer apply and operation may take place in accordance with the flow chart shown in FIG. 5.

Thus, with reference to FIG. 5, microprocessor 150 may be pre-programmed so that the press will automatically start another "run" cycle only after the operator has first cleared it of a finished workpiece and then installed a new workpiece in its place. In such a case, the microprocessor will make use of a number of additional flags to record the various light beam blockages which will occur in the course of placing and removing the various workpieces on the die of the press. More specifically, the microprocessor is arranged to utilize a "channel blocked" flag, an "interrupted scan" flag, a "first break" flag, and a "second break" flag.

For the purposes of the following description, it will be assumed that the press has just completed a power stroke and is in its "idle" mode waiting for the worked part to be removed and a new part to be inserted in the press. When the press has completed its power stroke, the signal on "select" line 230 will be "low", the signal on "control" line 235 will be "high", and all the flags will be clear. Press controls 215 then apply the "high" signal on "select" line 235, causing the microprocessor to monitor the light curtain for the interruption of at least two adjacent light beams caused by the operator's hand as he reaches in to remove the punched workpiece. When such an intrusion occurs, the "interrupted scan" flag and the "first break" flag are set and the "control" line is sent to "low". When the operator's hand is thereafter completely withdrawn, the "interrupted scan" flag is cleared. Thereafter, since the "select" line is still "high", the device continues to monitor for the interruption of at least two adjacent light beams, caused by the intrusion of the operator's hand as he reaches in to place the new workpiece on the die of the press.

This new intrusion causes the "interrupted scan" flag and also the "second break" flag to be set. The "select" line stays "high" and the "control" line stays "low". As soon as the operator's hand is completely removed from the curtain, the microprocessor resets the "control" line 235 to "high" and clears all flags. When press controls 215 see the "high" signal on "control" line 235, they respond by activating the press. Simultaneously, press controls 215 reset the "select" line to "low" so as to cause the microprocessor to monitor for the interruption of a single light beam during this "run" cycle of the press. If such an intrusion is detected, microprocessor 150 will immediately change the "high" signal on "control" line 235 to a "low" signal, causing punch press controls 215 to shut down the press. If no such intrusion is detected, the press will complete its power stroke without interruption. Operation then repeats as described above.

In this alternative embodiment, microprocessor 150 (rather than punch press controls 215) may be programmed to disarm the press in the event that two large intrusions do not occur within a fixed time period following completion of an operating cycle, e.g., within ten seconds.

OTHER MODIFICATIONS OF THE INVENTION

It is, of course, possible to modify the invention in other ways.

Thus, for example, the number of light sources 120, light sensors 130, drivers 125, and drivers 130 may be varied. Also, the program controlling microprocessor 150 may be changed so that three (or more) light beams are required to be broken to start the press when it is in its initial "idle" mode. Similarly, the program controlling microprocessor 150 could be modified so that two (or more) light beams are required to be broken to stop the press when it is in its "run" mode. It is also contemplated that the light beams may be activated in a sequence other than purely ascending, e.g. instead of activating light beam #2 after light beam #1 and light beam #3 after light beam #2, etc., one might activate the odd-numbered light beams (i.e., numbers 1, 3, 5, etc.) in ascending order, and then activate the even-numbered light beams (i.e., numbers 2, 4, 6, etc.) in ascending order or a totally different activation sequence may be utilized.

Still other modifications will be obvious to one skilled in the art.

ADVANTAGES OF THE INVENTION

A number of advantages are obtained by the present invention.

First, the invention provides an optical intrusion detection system which has a variable sensitivity, enabling it to be set to respond to the intrusion of an object of a first size during one phase of its associated machine's operation and to a object of a second size during another phase of the machine's operation.

Second, the invention provides an optical intrusion detection system which can be set so as to be insensitive to relatively small objects during one phase of its associated industrial machine's operation and yet sensitive to the same relatively small objects during another phase of the machine's operation.

Third, the invention provides an optical intrusion detection system which can be used as both a trigger device to start the operation of its associated industrial machine, and as a safety device to stop the operation of its associated machine.

What I claim is:

1. An optical intrusion detection system for enabling and/or disabling the operation of an associated industrial machine when an appropriate intrusion is detected, said system comprising:

light transmitter means for generating a plurality of light beams so as to form a light curtain;

light receiver means for sensing said light beams generated by said light transmitter means; and control means for operating said light transmitter means and light receiver means and controlling operation of the industrial machine, said control means comprising logic circuits for selectively (a) generating a first control signal for selectively enabling or disabling said machine when X or more light beams are blocked during a first phase of the operation of said machine, and (b) generating a second control signal for selectively enabling or disabling said machine when Y or more light beams are blocked during a second phase of the operation of said machine, wherein X and Y are both integers, X and Y are both $>0$, and $X \neq Y$.

2. An optical intrusion detection system according to claim wherein said control means generates said first control signal for enabling said machine when X or more light beams are blocked and then unblocked during an idle phase of said machine, and generates said second control signal for disabling said machine when Y or more light beams are blocked during an operating phase of said machine.

3. An optical intrusion detection system according to claim 2 wherein $X>1$ and $Y=1$, whereby said control means will start said machine after said light curtain is momentarily interrupted by a relatively large object, and will stop said machine when said light curtain is thereafter interrupted by a relatively small object.

4. An optical intrusion detection system according to claim 1 wherein said logic circuits of said control means comprise means for determining whether an odd-numbered or even-numbered light beam is interrupted.

5. An optical intrusion detection system according to claim 1 wherein said control means comprises a microprocessor.

6. An optical intrusion detection system according to claim 2 wherein $X>Y$.

7. An optical intrusion detection system for enabling and/or disabling the operation of an associated industrial machine when an appropriate intrusion is detected, said system comprising:
light transmitter means for generating a plurality of parallel spaced light beams so as to form a light curtain;
light receiver means for sensing said light beams generated by said light transmitter means; and
control means for operating said light transmitter means and light receiver means and controlling operation of the industrial machine, said control means comprising logic circuits for selectively (a) generating a first control signal for enabling said machine when X or more light beams are blocked and then unblocked during a first idle phase of the operation of said machine, and (b) generating a second control signal for disabling said machine when Y or more light beams are blocked during a second later operating phase of the operation of said machine, wherein X and Y are both integers, X and Y are both $>0$, and $X>1$ and $Y=1$, whereby said control means will start said machine after said light curtain is momentarily interrupted by a relatively large object, and will stop said machine when said light curtain is thereafter interrupted by a relatively small object.

8. A method of operating an industrial machine of the sort comprising light transmitter means for generating a plurality of spaced light beams so as to form a light curtain, light receiver means for sensing said light beams generated by said light transmitter means, and control means for operating said light transmitter means and said light receiver means and controlling operation of the industrial machine, said method comprising the steps of:
(1) selectively enabling or disabling said machine when X or more light beams are blocked during a first phase of the operation of said machine, and
(2) selectively enabling or disabling said machine when Y or more light beams are blocked during a second phase of the operation of said machine,
wherein X and Y are both integers, X and Y are both $>0$, and $X \neq Y$.

9. A method according to claim 8 wherein said machine is enabled when X or more light beams are blocked and then unblocked during an idle phase of said machine, and said machine is disabled when Y or more light beams are blocked during an operating phase of said machine.

10. A method according to claim 9 wherein $X>Y$.

11. A method according to claim 10 wherein $X>1$ and $Y=1$, whereby said machine will be enabled after said light curtain is momentarily interrupted by a relatively large object, and said machine will be disabled when said light curtain is thereafter interrupted by a relatively small object.

12. A method for operating an industrial machine of the sort comprising light transmitter means for generating a plurality of spaced light beams so as to form a light curtain, light receiver means for sensing said light beams generated by said light transmitter means, and control means for operating said light transmitter means and said light receiver means and controlling operation of the industrial machine, said method comprising the steps of:
(1) enabling said machine when X or more light beams are blocked and then unblocked during a first idle phrase of the operation of said machine, and
(2) disabling said machine when Y or more light beams are blocked during a second later operating phase of the operation of said machine,
wherein X and Y are both integers, X and Y are both $>0$, $X>1$ and $Y=1$, whereby said machine will be enabled after said light curtain is momentarily interrupted by a relatively large object, and said machine will be disabled when said light curtain is thereafter interrupted by a relatively small object.

13. An optical intrusion detection system according to claim 1 wherein said light transmitter means generates a plurality of parallel spaced light beams.

14. An optical intrusion detection system for enabling and/or disabling the operation of an associated industrial machine when an appropriate intrusion is detected, said system comprising:
light transmitter means for generating a plurality of light beams so as to form a light curtain;
light receiver means for sensing said light beams generated by said light transmitter means; and
control means for operating said light transmitter means and light receiver means and controlling operation of the industrial machine, said control means comprising logic circuits for selectively (a) generating a first control signal for selectively enabling said machine when X or more light beams are blocked during a first phase of the operation of said machine, and (b) generating a second control signal for selectively disabling said machine when Y or more light beams are blocked during a second phase of the operation of said machine, wherein X and Y are both integers, X and Y are both $>0$, and $X \neq Y$.

15. A method for operating an industrial machine of the sort comprising light transmitter means for generating a plurality of spaced light beams so as to form a light curtain, light receiver means for sensing said light beams generated by said light transmitter means, and control means for operating said light transmitter means and said light receiver means and controlling operation of the industrial machine, said method comprising the steps of:
   (1) selectively enabling said machine when X or more light beams are blocked during a first phase of the operation of said machine, and
   (2) selectively disabling said machine when Y or more light beams are blocked during a second phase of the operation of said machine, wherein X and Y are both integers, X and Y are both $>0$, and $X \neq Y$.

* * * * *

UNITED STATES PATENT AND TRADEMARK OFFICE
CERTIFICATE OF CORRECTION

PATENT NO. : 4,818,866

DATED : April 4, 1989

INVENTOR(S) : Daniel R. Weber

It is certified that error appears in the above-identified patent and that said Letters Patent is hereby corrected as shown below:

Claim 2, col. 15, line 15, insert the number "1" after the word "claim";

Claim 3, col. 15, line 23, the number "2" should be changed to the number -- 6 --;

Claim 8, col. 15, line 64, the first occurrence of the word "of" should be changed to -- for --; and Claim 12, col. 16, line 37, the word "phrase" should be changed to the word -- phase --.

Signed and Sealed this

Nineteenth Day of June, 1990

Attest:

HARRY F. MANBECK, JR.

*Attesting Officer*         *Commissioner of Patents and Trademarks*